No. 733,387. PATENTED JULY 14, 1903.
O. B. GRAVES.
HOLDER FOR PLOWSHARES.
APPLICATION FILED SEPT. 27, 1902.
NO MODEL.
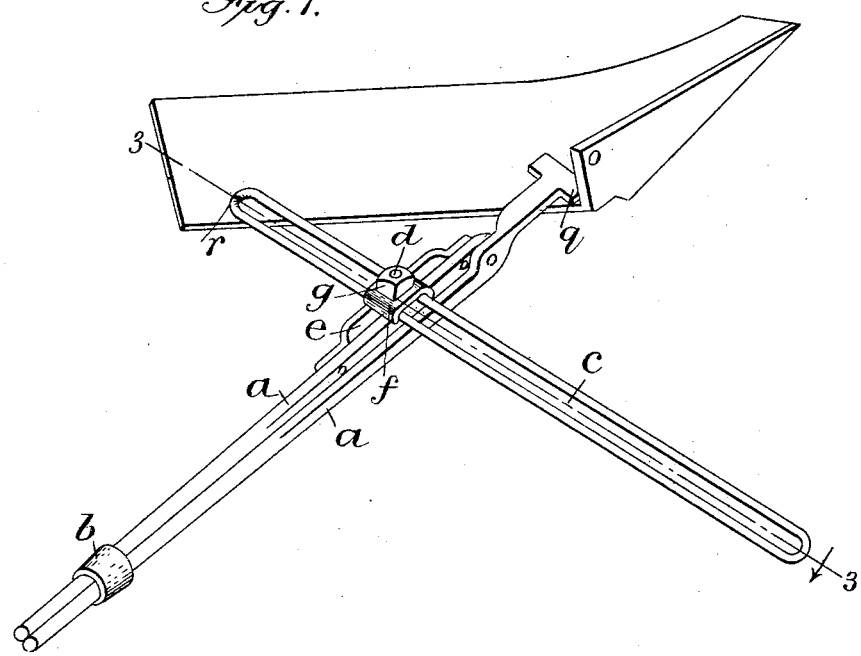
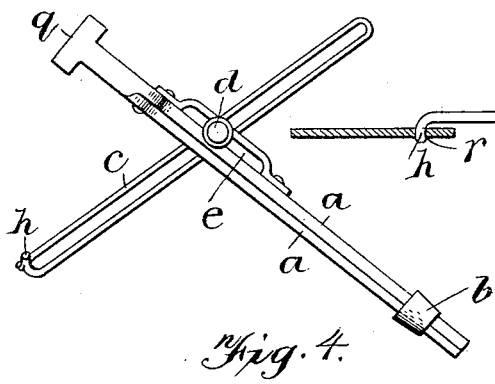
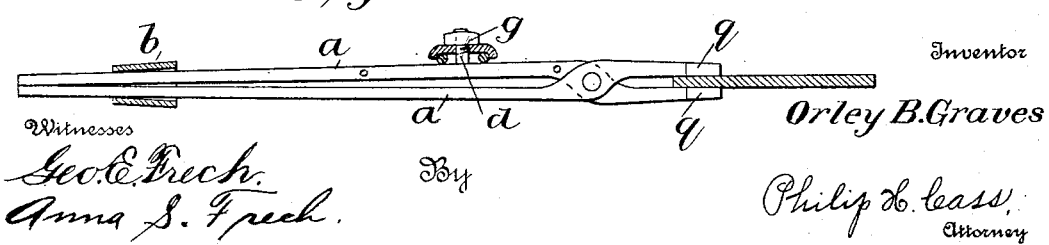
Witnesses
Geo. E. Frech.
Anna S. Frech.
Inventor
Orley B. Graves
By Philip H. Cass,
Attorney No. 733,387. Patented July 14, 1903.

UNITED STATES PATENT OFFICE.

ORLEY B. GRAVES, OF COFFEYVILLE, KANSAS.

HOLDER FOR PLOWSHARES.

SPECIFICATION forming part of Letters Patent No. 733,387, dated July 14, 1903.

Application filed September 27, 1902. Serial No. 125,067. (No model.)

*To all whom it may concern:*

Be it known that I, ORLEY B. GRAVES, a citizen of the United States, residing at Coffeyville, in the county of Montgomery and State of Kansas, have invented certain new and useful Improvements in Holders for Plowshares; and I do hereby declare the following to be a full, clear, and exact description of the invention, such as will enable others skilled in the art to which it appertains to make and use the same.

This invention relates to that class of holders or tongs used to hold plowshares while the same are being sharpened.

The object of this invention is to provide a holder which shall hold the plowshare rigidly, so that it cannot warp or spring out of its proper shape while being sharpened, and to provide a holder or means of grasping the share in such a manner that its weight shall be balanced regardless of what portion of it is being operated upon at the time.

I attain the object by my invention, which consists principally of tongs having two jaws and handles arranged to grasp the plowshare at any point and hold the same rigidly.

The invention also consists of a brace and support attached to said tongs and to be used in connection therewith.

Figure 1 is a perspective view of the holder attached to a right-hand plowshare in position for use. Fig. 2 is a perspective view of the reverse side of plowshare-holder. Fig. 3 is a cross-sectional view of the brace and support in position for use. Fig. 4 is a cross-sectional view of the tongs in position for use.

$a$ is a pair of tongs with wide lips, having upon its right side and firmly riveted to the same a member forming a slot $e$, said tongs being locked when in use by ferrule $b$, which is simply slipped over its ends.

$c$ is a brace and support which is attached to $a$ by a set-bolt $d$, which passes through prongs of brace and support $c$, thence through adjusting-slot $e$, thence through bridge-plate $f$ and set-nut $g$. Upon one end of said brace and support is a shouldered nipple $h$, corresponding in size to gage of bolt used in share.

When the parts of said invention are brought together, the mode of operation is as follows: The plowshare is grasped by the tongs at or about the position $q$, Fig. 1, and firmly locked by ferrule $b$. Set-nut $g$, Fig. 2, is loosened and nipple $h$ is inserted in outer hole of plowshare, as at $r$, Fig. 1. Then tongs and the brace and support are brought into a position of about right angles to each other, and set-nut $g$ is turned up tight by wrench, by which the ends of plowshare are brought into line. The end of brace having the nipple at its extremity has a considerable bend upward when tool is in position, which causes it to exert a constant upward pressure, but not to force the share farther than into line. While in said position the plowshare can be lifted and handled by free end of either tongs or the brace and support.

The same holder is adaptable to a left-hand plowshare by the following-described operation: Loosen set-nut $g$, Fig. 2, and grasp free end of the brace and support and push end containing nipple $h$ downward until said nipple passes freely under lips of tongs and to the other side of the same and attach in the same manner as for right-hand plowshare.

Having thus described my invention, what I claim, and desire to secure by Letters Patent, is—

1. The combination with a pair of tongs, of a laterally and longitudinally adjustable member carried by said tongs.

2. The combination with a pair of tongs, formed of two elongated members pivoted together, one of said members having an elongated slot therein, a bolt passing through said slot and adjustable therein, a laterally-extending member carried by said bolt and means carried by the bolt for holding said member in the said adjusted position.

3. The combination with a pair of tongs formed of two elongated pivoted members, one of said members having an elongated slot therein, a laterally-extending elongated member having an elongated longitudinal opening therein, and a clamping-bolt passing through the slot in the tongs and a slot in the laterally-extending member.

4. The combination with a pair of tongs formed of two elongated members pivoted together, one of said members having an elongated slot therein, a laterally-extending elongated member having a longitudinal slot therein, a plate straddling the said laterally-extending member and a clamping-belt passing through said plate and the slot in the laterally-extending member and the tongs, whereby the tongs and the laterally-extending member are adjustably connected.

5. The combination with a pair of tongs formed of two elongated members pivoted together, one of said members having a loop secured to the side of one of said tong members forming an elongated slot therein, a laterally-extending elongated member having a downwardly-turned outer end and an elongated slot therein, a plate straddling the said laterally-extending member and a clamping-bolt passing through said plate and the slot in the laterally-extending member and the tongs, whereby the tongs and the laterally-extending member are adjustably connected.

In testimony whereof I have affixed my signature in presence of two witnesses.

ORLEY B. GRAVES.

Witnesses:
J. McCREARY,
HARRY S. BROWN.